March 2, 1965   S. M. SHOBERT   3,171,229
ATTACHMENT OF LINE GUIDES ON FISHING RODS
Filed Sept. 20, 1961
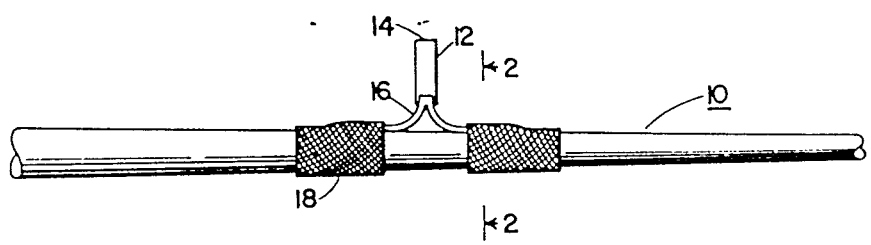
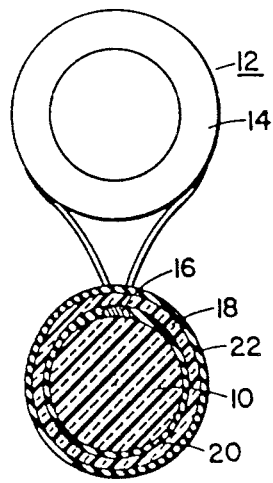
*INVENTOR.*
SAMUEL M. SHOBERT
BY Gust & Irish
ATTORNEYS United States Patent Office 3,171,229
Patented Mar. 2, 1965

3,171,229
ATTACHMENT OF LINE GUIDES ON
FISHING RODS
Samuel M. Shobert, 16050 Ireland Road, Mishawaka, Ind.
Filed Sept. 20, 1961, Ser. No. 139,483
7 Claims. (Cl. 43—24)

This invention relates generally to fishing rods and more particularly to the attachment of line guides thereon.

Fishing rods conventionally include a plurality of line guides secured to the surface of the rod at spaced intervals therealong for guiding the fishing line from the reel at the butt or handle end of the rod to the outer end of the rod. Line guides conventionally comprise a ring or loop element through which the line passes and a pair of oppositely extending leg elements. In conventional fishing rod constructions, the leg elements of the line guides are secured to the rod by wrapping with suitable thread or cord which is thereafter coated with a suitable resin. There is a tendency, however, for such wrapping to unravel after the rod has been used for a time and exposed to moisture. Other methods of attaching line guides to fishing rods have been proposed, however to the best of the present applicant's knowledge, they have been characterized by their relative expense, weakening of the rod at the points of attachment, or have imparted different flexural characteristics to the rod at the point of attachment than at points intermediate the line guides.

It is therefore desirable to provide an improved attachment for line guides on fishing rods which will hold the line guide securely in place for the life of the rod, which has the same flexural characteristics as the rod, which is resistant to weather and scuffing, and which is further characterized by its simplicity, ease of assembly and thus relatively low cost.

It is accordingly an object of my invention to provide an improved attachment for line guides on fishing rods.

Another object of my invention is to provide an improved attachment for line guides on fishing rods characterized by its resistance to weather and moisture.

A further object of my invention is to provide an improved attachment for line guides on fishing rods characterized by its simplicity and ease of assembly.

Another object of my invention is to provide an improved attachment for line guides on fishing rods wherein the flexural characteristics of the attachment and the rod are the same.

Further objects and advantages of my invention will become apparent by reference to the following description and the accompanying drawing, and the features of novelty which characterize my invention will be pointed out with particularity in the claims annexed to and forming a part of this specification.

In its broader aspects, my invention provides a pair of preformed sleeves of flexible material respectively telescoped over the rod and the legs, the sleeves being adhered to the rod element by cured thermosetting resin which completely fills the voids between the legs, sleeves and rod thereby securing the line guide to the rod.

In the drawing:

FIG. 1 is a side elevational view showing my invention; and

FIG. 2 is a cross-sectional view taken along the line 2—2 of FIG. 1.

Referring now to the figures of the drawing, there is shown at 10 a section of a conventional tapered fishing rod of cylindrical cross-section preferably formed of cured thermosetting resin, such as epoxy, reinforced with glass threads as is well known to those skilled in the art. One line guide 12 is shown, it being understood that a plurality of such line guides will be provided spaced along the length of the rod, the line guide 12 comprising a ring element 14 through which the line passes supported by a pair of elongated oppositely extending leg elements 16.

In order to secure leg element 16 on the surface of the rod 10, I provide a pair of sleeves 18 which are snugly telescoped over the rod 10 and the leg elements 16. In the preferred embodiment of my invention, sleeves 18 are formed of tubular braided glass threads which immediately prior to assembly on the rod, are thoroughly impregnated with suitable catalyzed thermosetting resin, preferably epoxy. After telescoping of the thus impregnated braided sleeves 18 over the rod 10 and the leg element 16 of the wire guides 12, the resin is cured. Thus, as best seen in FIG. 2, after curing, the sleeves 18 are adhered to the rod 10 by a layer 20 of cured thermosetting resin which fills any voids which exist between the sleeves 18, the leg elements 16 and the rod 10, as shown.

The employment of glass braid for the sleeves 18 together with the thermosetting resin of the same type employed in the rod 10, such as epoxy, results in a homogeneous or unitary structure in which the flexural characteristics of the rod 10 and the sleeves 18 are the same.

In the preferred embodiment of my invention, the outer surface of the sleeves 18 are covered with a layer 22 of suitable thermoplastic material, such as vinyl or acrylate, which provides resistance against weather and scuffing.

While I prefer to employ a braid of glass threads for the sleeves 18, braided tubes formed of other types of thread, such as cotton thread may be employed, the important characteristic of the sleeves 18 being their flexibility to permit their being snugly telescoped over the rod 10 and the legs 16. Other sleeves formed of other flexible material may be employed and in the event that such sleeves are not sufficiently porous to permit their being impregnated with resin, the thermosetting resin must be initially applied to the interior surface of the sleeves prior to their assembly on the rod.

It will be seen that the improved line guide attachment of my invention is not subject to unraveling, does not in any respect weaken the rod at the point of attachment, but on the contrary provides a unitary structure having the same flexural characteristics as the rod. It will further be observed that my line guide atachment is characterized by its simplicity and ease of attachment and thus relatively low cost.

While I have illustrated and described a specific embodiment of my invention, further modifications and improvements will occur to those skilled in the art, and I desire therefore in the appended claims to cover all modifications which do not depart from the spirit and scope of this invention.

What is claimed is:

1. In a fishing rod assembly comprising an elongated tapered rod element of circular cross-section and a line guide having a pair of oppositely extending legs for securing the same to the surface of said rod element; the combination with said rod element and line guide of a pair of preformed sleeves formed of flexible material respectively snugly telescoped over said rod element and legs, said sleeves having their inner surfaces coated with and being impregnated with cured thermosetting resin which adheres the same and said legs to said rod element and completely fills the voids between said legs, sleeves and rod elements thereby securing said line guide to said rod element, said rod element being formed of cured epoxy resin reinforced with glass threads, said sleeves being formed of braided glass, and said thermosetting resin being epoxy of the same type as that of said rod element whereby said sleeves and rod element form a homogeneous structure having the same flexural characteristics.

2. In a fishing rod assembly comprising an elongated tapered rod element of circular cross-section and a line guide having a pair of oppositely extending legs for securing the same to the surface of said rod element; the combination with said rod element and line guide of a pair of preformed sleeves formed of flexible material respectively snugly telescoped over said rod element and legs, said sleeves having their inner surfaces coated with and being impregnated with cured thermosetting resin which adheres the same and said legs to said rod element and completelf fills the voids between said legs, sleeves and rod elements thereby securing said line guide to said rod element, said rod element being formed of cured epoxy resin reinforced with glass threads, said sleeves being formed of braided glass, said thermosetting resin being epoxy of the same type as that of said rod element whereby said sleeves and rod element form a homogeneous structure having the same flexural characteristics and a layer of thermoplastic material on the outer surface of each of said sleeves.

3. In a fishing rod assembly comprising an elongated tapered rod element of circular cross-section and a line guide having at least one leg for securing the same to the surface of said rod element, the combination with said rod element and line guide of at least one preformed flexible sleeve of tubular braided glass snugly telescoped over said rod element and leg, said sleeve being impregnated with cured thermosetting resin which adheres the same and said leg to said rod element and fills the voids between said leg, said sleeve and said rod element thereby securing said line guide to said rod element, said rod element being of cured resin reinforced with glass fibers, said thermosetting resin being epoxy and having flexural characteristics which correspond to the flexural characteristics of said rod element.

4. A fishing rod assembly comprising a tapered rod element of cured thermosetting resin reinforced with glass threads, a line guide having at least one leg element secured to the surface of said rod element, a preformed tubular braided glass thread sleeve telescoped over said rod element and said leg element, said sleeve being porous and flexible, and cured thermosetting resin adhering said sleeve and said leg element to said rod element, said last-mentioned cured resin impregnating said sleeve and filling the voids between said leg element, said sleeve and said rod element, thereby providing a unitary structure having flexural characteristics in the region of said sleeve which correspond to those of said rod element.

5. A fishing rod assembly comprising a tapered rod element of cured thermosetting resin reinforced with glass threads, said rod element being of circular cross-section, a line guide having at least one leg element secured to the surface of said rod element, a preformed tubular braided glass thread sleeve telescoped over said rod element and said leg element, said sleeve being porous and flexible, and cured epoxy resin adhering said sleeve and said leg element to said rod element, said cured epoxy resin impregnating said sleeve and the voids between said leg element, said sleeve and said rod element thereby providing a unitary structure having flexural characteristics which correspond to those of said rod element.

6. The fishing rod assembly of claim 5 wherein the cured thermosetting resin of the rod element is epoxy.

7. The fishing rod assembly of claim 5 wherein said line guide is provided with two elongated oppositely extending leg elements, two of said sleeves being telescoped snugly over said rod element and said two leg elements, respectively, there being one sleeve for each leg element, each sleeve being impregnated with said cured epoxy resin, said epoxy resin securing each sleeve and each leg element to said rod element and also filling all voids between said rod element, said leg elements and said sleeves.

References Cited in the file of this patent

UNITED STATES PATENTS

| | | |
|---|---|---|
| 1,318,421 | Welles | Oct. 14, 1919 |
| 1,617,972 | Wallace | Feb. 15, 1927 |
| 1,871,229 | Welch | Aug. 9, 1932 |
| 2,159,795 | Harsted | May 23, 1939 |
| 2,292,519 | Hiner | Aug. 11, 1942 |
| 2,619,714 | Dornaus | Dec. 2, 1952 |
| 2,659,544 | Freeman | Nov. 17, 1953 |
| 2,749,643 | Scott | June 12, 1956 |
| 2,787,484 | Macy | Apr. 2, 1957 |

FOREIGN PATENTS

| | | |
|---|---|---|
| 855,731 | France | Feb. 19, 1940 |

OTHER REFERENCES

Popular Science, vol. 168, No. 3 (magazine), March 1956, pages 212 to 217.